No. 803,137. PATENTED OCT. 31, 1905.
W. SALMON.
ATTACHMENT FOR MILLING MACHINES.
APPLICATION FILED FEB. 1, 1904.

3 SHEETS—SHEET 1.

WITNESSES:
T. P. Britt
E. C. Duffy

INVENTOR
Wilfried Salmon
BY
C. E. Dubbydson
Attorneys

No. 803,137. PATENTED OCT. 31, 1905.
W. SALMON.
ATTACHMENT FOR MILLING MACHINES.
APPLICATION FILED FEB. 1, 1904.
3 SHEETS—SHEET 2.
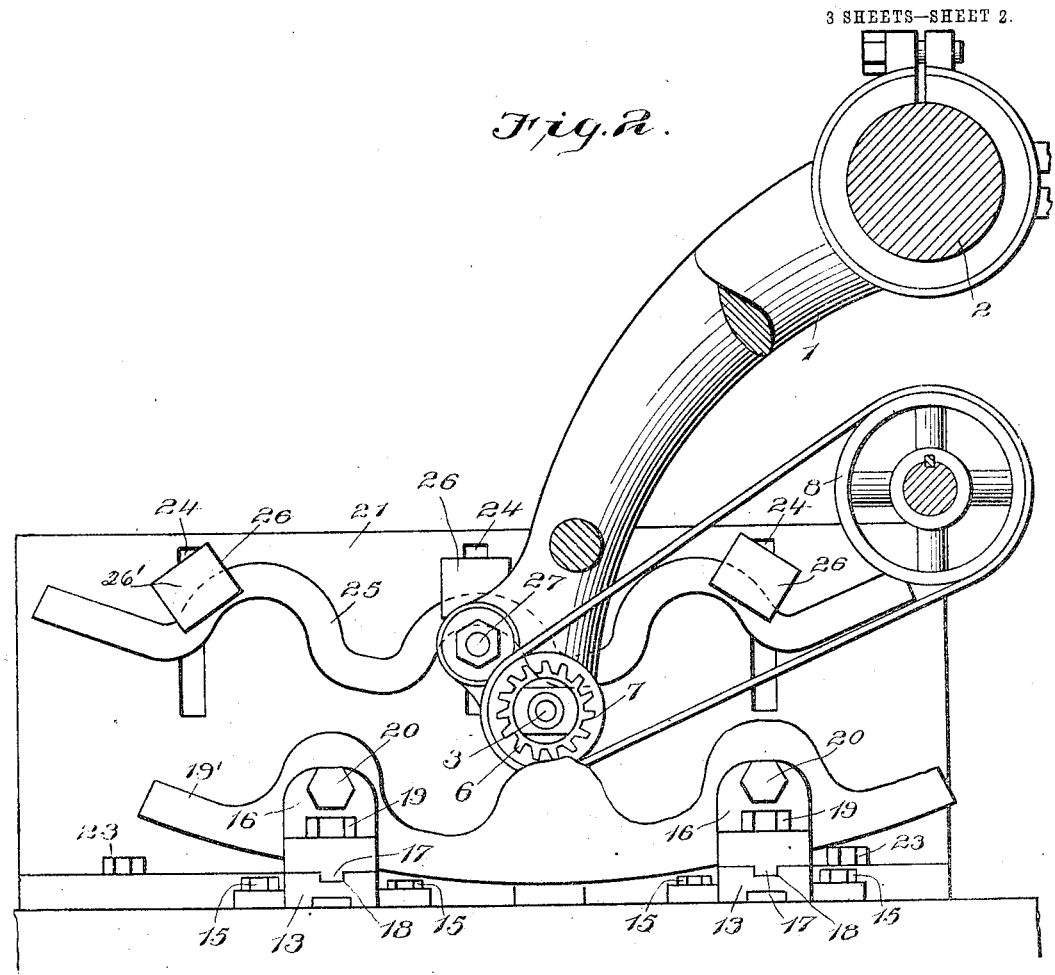
Fig. 2.
Fig. 4.
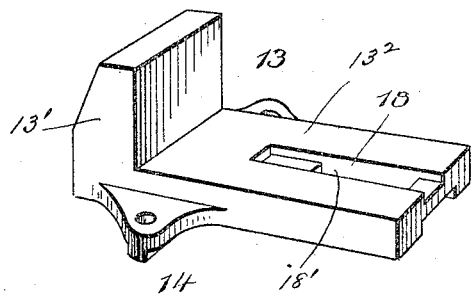
WITNESSES:
T. P. Britt
E. C. Duffy
INVENTOR
Wilfried Salmon,
BY
C. E. Duffy & Son
Attorneys

UNITED STATES PATENT OFFICE.

WILFRIED SALMON, OF BRAINERD, MINNESOTA.

ATTACHMENT FOR MILLING-MACHINES.

No. 803,137.  Specification of Letters Patent.  Patented Oct. 31, 1905.

Application filed February 1, 1904. Serial No. 191,568.

*To all whom it may concern:*

Be it known that I, WILFRIED SALMON, a citizen of the United States, residing at Brainerd, in the county of Crow Wing and State of Minnesota, have invented certain new and useful Improvements in Attachments for Milling-Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to attachments for milling-machines, and has for its object to provide an attachment by means of which links and camwork can be easily, speedily, and accurately milled.

With this object in view my invention consists in the novel construction and arrangement of parts of my milling-machine attachment.

My invention consists particularly in the combination of parts, which will be first fully described and afterward specifically pointed out in the appended claims.

Figure 1:
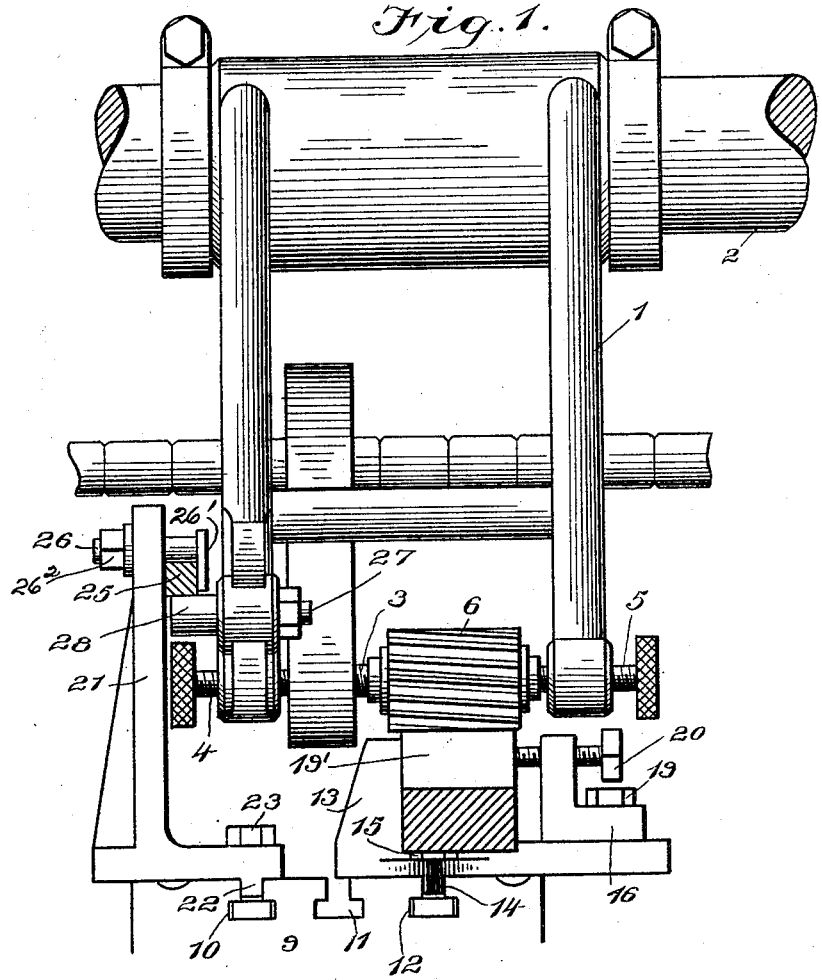
Figure 5:
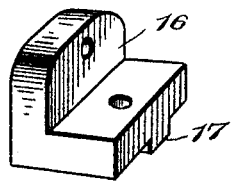
Figure 3:
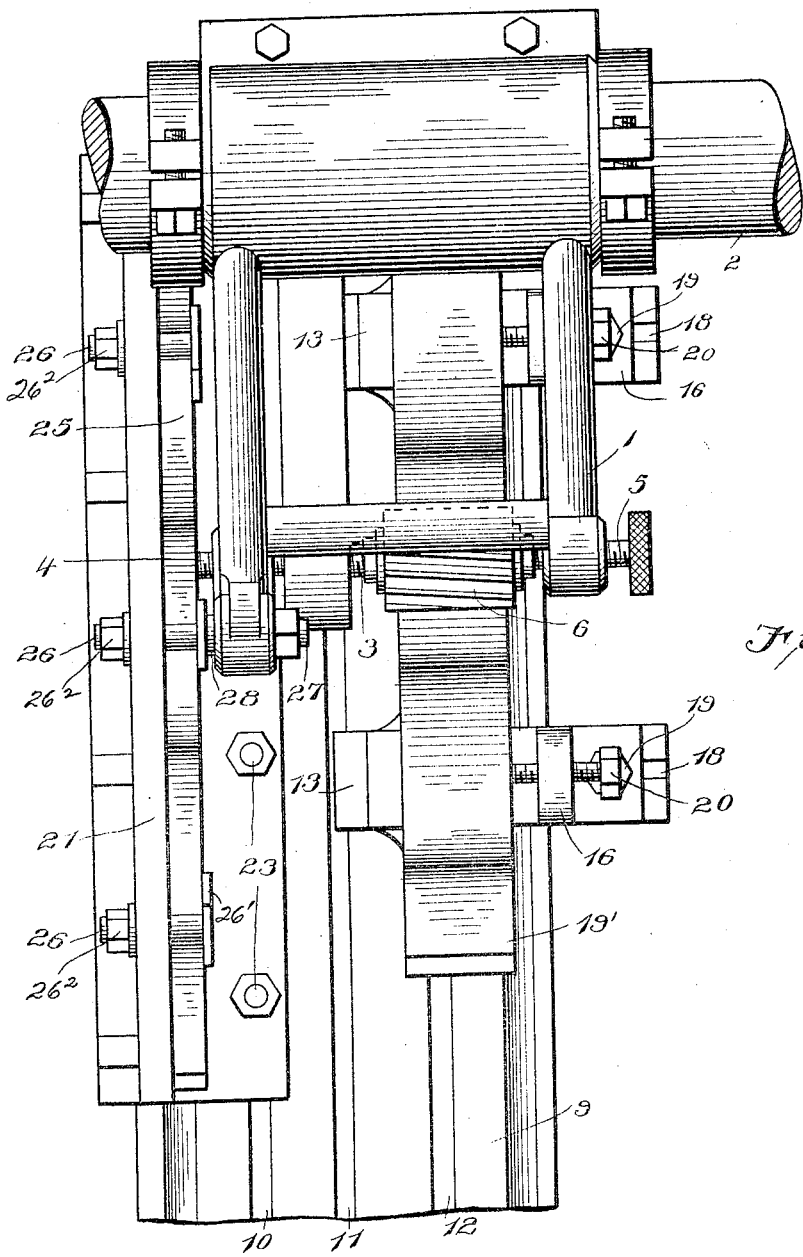

Referring to the accompanying drawings, Figure 1 shows my attachment in position for milling link and all camwork. Fig. 2 is a front elevation of the same. Fig. 3 is a top plan view of the same. Fig. 4 is a perspective view of one of the work-holding angle-plates, and Fig. 5 is a perspective view of companion work-holding angle-plate.

Like numerals of reference indicate the same parts throughout the several drawings, in which—

1 is the adjustable cutter extension which is securely fastened upon the upper arbor 2 of a milling-machine and adjustable thereon, said extension being clamped around the arbor 2, as shown. Carried by said adjustable cutter extension 1 is the arbor 3, held in position by the adjustable centers 4 and 5. The milling-cutter 6 is carried on said arbor 3, and a pulley 7 is also secured to said arbor and is belted to a pulley 8, from whence power is transmitted to the cutter.

9 indicates the bed-plate, which is provided with a series of grooves 10, 11, and 12, the central groove 11 being provided for the angle-plate 13 should occasion require or the character of the work demand. The work-holding angle-plate 13 is provided with a transverse tongue 14, which enters said groove 12, as shown in Fig. 1. Suitable bolts 15 are employed to hold said tongue 14 within the said groove 12, as shown in Fig. 1. The work-holding angle-plate 13 comprises a vertical wall 13', a horizontal portion 13², a groove 18 in said portion, and a small slot 18', through which slot the bolt 19 of the smaller angle-plate 16 passes. 16 also indicates a work-holding angle-plate which is provided with a longitudinal tongue 17, which tongue is adapted to enter a longitudinal groove 18 in the work-holding angle-plate 13. A suitable bolt 19 is passed through said angle-plate 16 and through the angle-plate 13 to securely hold the angle-plate 16 in position on said angle-plate 13, said angle-plate 16 being adjustable on said angle-plate 13 by this means.

19' indicates the work to be milled, which is shown in front elevation in Fig. 2, said work being secured in the work-holding angle-plates 13 by means of clamping-bolts 20.

21 indicates the templet-holding angle-plate, which is provided with a transverse tongue 22, which enters the groove 10 of the bed-plate and is held therein by means of bolts 23, said angle-plate being slidable on the bed-plate 9. Referring to Fig. 2, it will be seen that said angle-plate 21 is provided with a series of vertical and parallel slots 24. 25 indicates the templet, which is held in position on said angle-plate 21 by means of the clamping-bolts 26, which are provided with enlarged heads 26', which engage the face of the templet. Nuts 26² on each of said bolts securely hold the head 26' of said bolts in contact with the templet.

In the adjustable cutter extension 1 I provide a pin 27, extending outwardly and above the cutter and carrying a roller 28 thereon, adapted to engage the under side of the templet 25, as shown in Fig. 1.

Having thus described the several parts of my invention, its operation is as follows: When it is desired to use my attachment for milling links, camwork, and irregular surfaces, a suitable templet—as, for instance, of the form shown in the drawings—is securely clamped in position upon the templet-holding angle-plate 21. The work to be milled is securely clamped in the work-holding angle-plates 13 and 16, and as the cutter 6 is revolved and as the bed-plate 9 is movable the work-piece and templet pass along. The roller 28 on the pin 27 being in engagement with the under side of the templet guides the cutter and the adjustable cutter extension and causes said cutter to follow the path of the templet and mill the work-piece according to the outline of said templet.

Of course it is understood that a number of different forms, sizes, and kinds of templets must be employed in order to adapt my attachment to different kinds and shapes of links, camwork, or irregular surfaces; but of course the number and kind of templets can be unlimited, and I do not confine myself to that particular form as shown in the drawings nor to any kind or number whatever, as the form of templet shown is merely for the purpose of illustrating the construction and operation of my invention.

Having thus described my invention, I do not wish to be understood as limiting myself in any way to the exact construction herein set forth, as various slight changes might be made therein which would fall within the limit and scope of my invention, and I consider myself clearly entitled to all such changes and modifications.

What I claim as my invention, and desire to secure by Letters Patent of the United States, is—

1. The combination with a cutter of a bedplate below said cutter, an angle-plate and means for adjusting the same on said bedplate, said angle-plate being provided with a series of slots, a templet carried on said angle-plate, means passing through said slots to secure said templet to said angle-plate, a guiding element associated with said cutter, and adapted to engage said templet to guide said cutter, and means for holding the work below said cutter, substantially as described.

2. The combination with a cutter, of a bedplate below said cutter and provided with a series of grooves, a templet associated with said cutter, means for holding said templet, said holding means being constructed so as to be adjustable in one of said grooves, a work-holding angle-plate constructed so as to be longitudinally adjustable in one of said grooves, a companion work-holding angle-plate transversely adjustable on the former work-holding angle-plate and means for clamping the work between said two work-holding angle-plates, substantially as described.

In testimony whereof I affix my signature in presence of two witnesses.

WILFRIED SALMON.

Witnesses:
T. C. BLEWITT,
WILLIS H. MANTOR.